No. 859,460. PATENTED JULY 9, 1907.
W. A. McINTOSH.
LACING HOOK.
APPLICATION FILED JAN. 28, 1907.
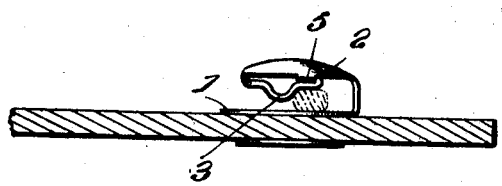
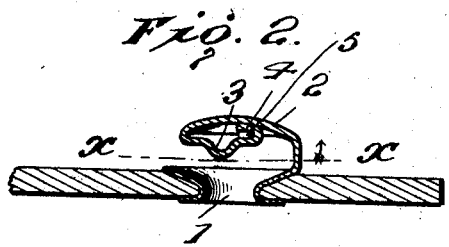 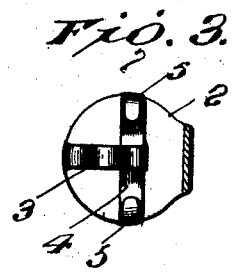
W. A. McIntosh
Inventor
Witnesses

UNITED STATES PATENT OFFICE.

WILLIAM A. McINTOSH, OF WILBUR, WASHINGTON.

LACING-HOOK.

No. 859,460.

Specification of Letters Patent.

Patented July 9, 1907.

Application filed January 28, 1907. Serial No. 354,509.

*To all whom it may concern:*

Be it known that I, WILLIAM A. MCINTOSH, a citizen of the United States, residing at Wilbur, in the county of Lincoln and State of Washington, have invented certain new and useful Improvements in Lacing-Hooks, of which the following is a specification.

The object of this invention is to provide a simple, durable and cheap form of lacing hook for shoes.

The invention is particularly advantageous from the standpoint of manufacture, and the hook comprising the same is very substantial and is intended to prevent likelihood of disengagement of the laces of the shoes therefrom, under actual conditions of service of the article.

For a full understanding of the invention and the merits thereof and also to acquire a knowledge of the details of construction, reference is to be had to the following description and accompanying drawings, in which:

Figure 1 is a side elevation of a lacing hook comprising the invention applied. Fig. 2 is a transverse sectional view. Fig. 3 is a sectional view on the line $x$—$x$ of Fig. 2 looking outwardly toward the under side of the hook.

Corresponding and like parts are referred to in the following description and indicated in all the views of the drawings by the same reference characters.

Specifically describing the invention, the lacing hook is of the general conformation of those most commonly in use at the present time, especially upon men's shoes. Said hook consists of the base 1 adapted to be secured to the flaps of a shoe, or to any similar equivalent part, and from which extends outwardly the hook member 2. The hook member 2 is an integral extension of the base 1 and curves outwardly and laterally so that its outer portion is in a substantially parallel relation to the base. The hook member 2 is formed with an integral leaf 3 at its outer extremity, said leaf being bent beneath the outermost portion of the hook member and having an intermediate portion thereof pressed downwardly to form a curved protuberance. The extremity of the leaf 3 is bent upwardly upon itself and is formed with the lateral arms 4 which project in opposite directions therefrom and are engaged by small tongues 5, which extend from opposite sides of the hook member 2, and are bent beneath the outermost portion of said hook member to engage the said arms 4 of the leaf 3. The protuberance formed by the leaf 3 has a spring action which prevents or obviates likelihood of accidental displacement of the lacing from the lacing hook, especially if the lacing of the shoe becomes slightly loose, the hook is of course as durable, if not more so than those at present commonly in use.

Having thus described the invention, what is claimed as new is:

1. A lacing hook comprising a base, an outstanding hook member, an extension projecting from the hook member and bent rearwardly against the same to form a protuberance for the purpose specified, and tongues carried by the hook member for engaging the extension.

2. A lacing hook comprising a base, an outstanding hook member, an extension projecting from the hook member and bent rearwardly against the same to form a protuberance for the purpose specified, laterally extending arms carried by the extension, and means for connecting the said laterally extending arms and the hook member.

In testimony whereof I affix my signature in presence of two witnesses.

WILLIAM A. McINTOSH. [L. S.]

Witnesses:
ELEONORE RIVET,
J. DOUGLAS RIVET.